Jan. 31, 1967  H. LINDEMANN  3,300,970
TORQUE CONVERTER
Filed April 5, 1965
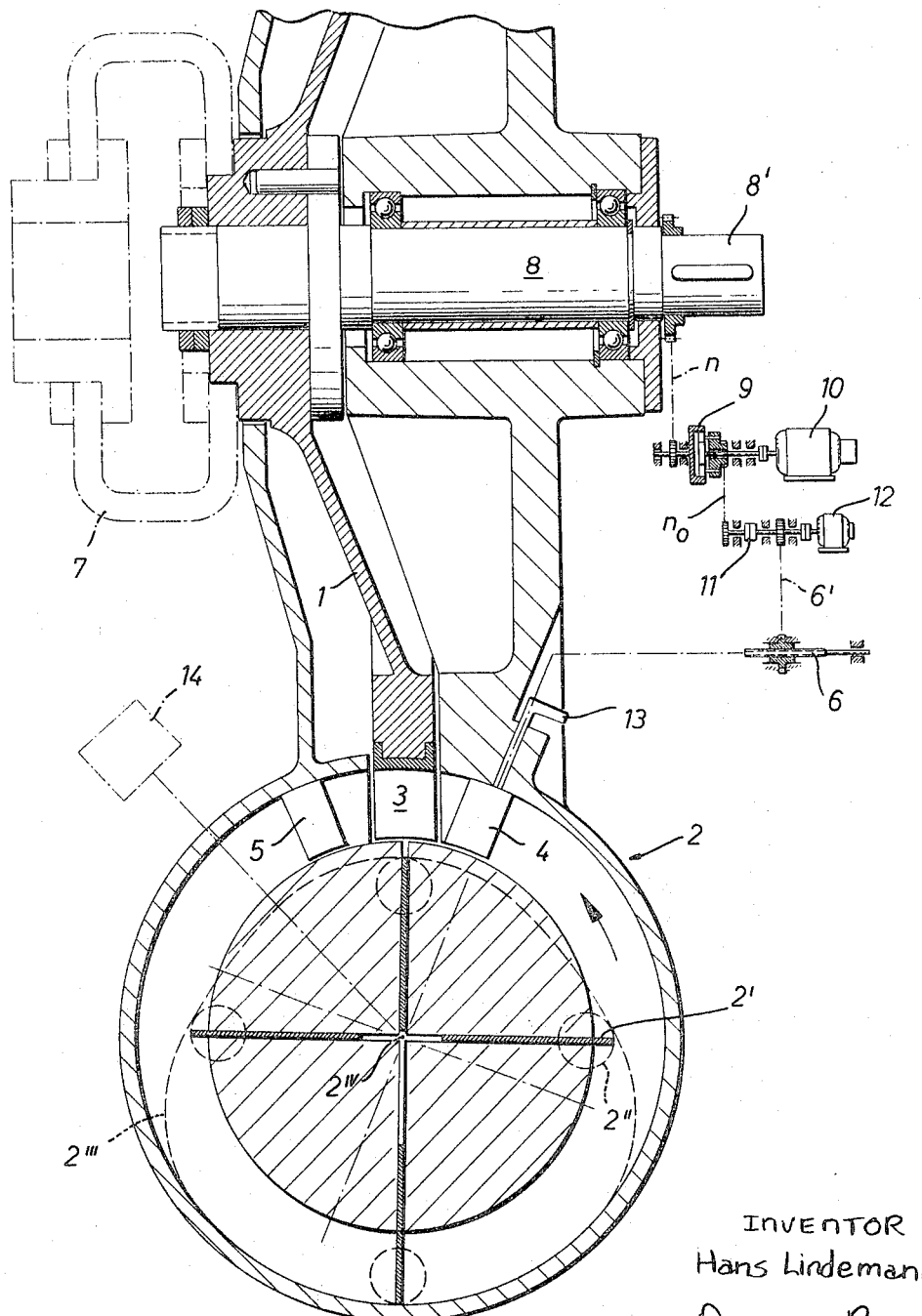
INVENTOR
Hans Lindemann
By Dicke & Craig
ATTORNEYS

United States Patent Office 3,300,970
Patented Jan. 31, 1967

3,300,970
TORQUE CONVERTER
Hans Lindemann, Grossdornberg, Germany, assignor to Th. Calow & Co., Bielefeld, Germany
Filed Apr. 5, 1965, Ser. No. 445,617
6 Claims. (Cl. 60—54)

The present invention relates to a torque converter which comprises a rotary pump for circulating a flow of liquid or gas, and a turbine which is driven by this flow and is rotatable within a plane extending at right angles to the plane of rotation of the pump so that only some of the turbine blades are acted upon simultaneously by this flow.

The torque converters of this type which were known prior to this invention permit the output torque of the driven shaft of the turbine to be varied within ranges which deviate only to a relatively small extent from the input or driving torque. If the input torque of a onestage torque converter of the known type amounts, for example, to 100 mkg., an output torque may be attained which amounts to 100 to 300 mkg. If it was desirable to increase the output torque considerably without increasing the input torque so that, for example, at an input torque of 100 mkg. an output torque of 1000 to 3000 mkg. could be attained, it has previously been necessary to provide the torque converter with an additional gear stage with a ratio of 1 to 10.

It is an object of the present invention to provide a torque converter of the mentioned type which at a low input torque permits a high output torque to be attained without requiring such a gear stage.

For attaining this object, the invention provides that the pump and the turbine of the torque converter are combined with each other so as to form a unit in which they interengage with each other in a manner similar to that in which a worm and a worm wheel interengage in a worm gear. In this manner it is possible to attain speed ratios as large as may be attained in worm drives without, however, requiring any of the usual transmission means, such as toothed-wheel gearings or chain drives and also without requiring the usual conduits between the pump and turbine as were previously required in torque converters of the above-mentioned type.

Another object of the invention consists in providing a torque converter which is designed so as to permit the turbine torque to be varied in a manner which is known as such and consists of varying the angle of incidence of the turbine blades and/or of the guide vanes. For this purpose, the invention provides suitable control means for varying the turbine torque in a manner so that, when the speed of the turbine is adjusted to a certain desired value, it will remain constant. A torque converter according to the invention which is designed in this manner may be employed with particular advantage as a reduction gearing for the operation of various machines, for example, of elevators, cable cars, or the like, in which the drive shaft runs at a very high speed, while the driven shaft should run at an extremely low speed.

The features and advantages of the present invention will become more clearly apparent from the following detailed description thereof which is to be read with reference to the accompanying drawing which shows diagrammatically a cross section of a torque converter according to the invention in which the axis of rotation of a rotary positive-displacement pump is located within the plane of rotation of the turbine.

As illustrated in the drawing, the torque converter according to the invention essentially consists of a turbine 1 and a rotary positive-displacement pump 2 which is driven by an induction motor 14 and produces a circulation of a liquid or gas which acts directly upon the blades 3 of the turbine. The rotor of the pump 2 contains slide valves 2' which are guided by a cam track 2''', preferably by means of rollers 2'' which are mounted near the outer ends of the slide valves and are adapted to protect the outer edges of the slide valves from the wear which would otherwise occur at the high speed of this pump. The turbine 1 consists of a ring of turbine blades 3 which is rotatable about the axis of a shaft 8, one or more guide vanes 4 preceding the turbine blades 3, and one or more fixed guide vanes 5 behind the turbine blades, as seen in the direction of flow of the fluid, as indicated by the arrow. The angle of incidence of the guide vane or vanes 4 is adjustable by any suitable means, as indicated diagrammatically by a handle 13, so as to influence the flow of the fluid, for example, oil, which is circulated by the pump past the turbine blades 3. The fixed guide vane or vanes 5 following the turbine blades 3 are provided for eliminating the twist of the current which is caused by its flow past the turbine blades. One end of the shaft 8 of the turbine rotor is connected by a clutch 7 directly to the particular shaft 8 which is to be driven, for example, the shaft of a cable wheel, while the other end 8' of this shaft is adapted to receive, for example, a pulley or the like which may be driven by auxiliary driving means as required, for example, in the operation of cable cars in roder to permit the cars to be moved to a station in the event of a breakdown of the main drive.

For adjusting the guide vanes 4, the invention provides an automatic control mechanism, the principal element of which consists of a differential gearing 9 which is adapted to compare the actual speed $n$ of the turbine with the control speed $n^0$ of an infinitely variable electric control unit. If the two speeds differ from each other, the differential speed which is thereby produced is employed for adjusting the guide vanes 4 by the rotation of a spindle 6 which is driven by a chain drive 6'. By means of the infinitely variable control unit it is possible to adjust the speed of the turbine to any desired value, for example, from 0 to + or −64 r.p.m.

For starting the operation of the torque converter, the motor 14 is at first switched on which drives the pump 2 and thereby starts the circulation of the fluid. However, as long as the guide vanes 4 are set to their neutral position, the turbine will not be driven since its blades 3 have a symmetrical shape and no force will therefore be exerted thereon by the current of fluid. The next step is therefore to start the control motor 10 which determines a certain starting speed. A differential speed is then produced in the differential gearing which by means of the spindle 6 adjusts the guide vanes 4 to the angle at which the full starting force will be exerted thereon. The turbine 1 will then automatically reach the predetermined starting speed. If the turbine should be accelerated to a higher speed, it is necessary to increase the speed accordingly on the control unit.

If the torque converter according to the invention is to be employed for driving cable cars, it has to be equipped with a brake. The braking effect of this brake is caused primarily by a reversal of the flow of fluid acting upon the turbine blades. If the turbine is to be stopped, it is first necessary to reduce its speed to a certain value by reducing the control speed accordingly. Thereafter the control motor 10 is stopped completely so that the differential speed provided by the differential gearing 9 will be equal to the momentary speed of the turbine. The guide vanes 4 are thereby adjusted to their reversed position so that a braking force will then act upon the turbine blades. Since the guide vanes 4 may be turned in either direction only to a limited extent, a friction clutch may be provided between the differential gearing 9 and the spindle 6. In order to prevent the turbine from running in the reverse direction as the result of the strong reversing moment, it is advisable to provide an auxiliary motor 12 which, if the torque converter is used for driving cable cars, is switched off by limit switches when the car arrives at the different stations. The guide vanes 4 will thus be adjusted by the spindle 6 to such a position that the cable cars will be reliably stopped at the different stations.

Since the operation of the turbine is normally stopped by reversing the position of the guide vanes 4, it is only necessary to switch off the main drive when the entire mechanism should be stopped for a considerable length of time, for example, in cable car drives during the night.

From the above description it will be apparent that by means of the invention it has been possible to solve the object as mentioned in the beginning, namely, to produce a torque converter with high speed ratios between the drive shaft and the driven shaft without requiring any additional reduction gears or similar means, and that the torque converter which is designed according to the invention is of a very compact construction and may therefore be mounted within a very confined space. It is also evident that, because of its extremely simple structure and the omission of additionl gear means and the long conduits which were previously required for all torque converters of this type, the torque converter according to the invention may be built at a much lower cost.

Although my invention has been illustrated and described with reference to the preferred embodiment thereof, I wish to have it understood that it is in no way limited to the details of such embodiment but is capable of numerous modifications within the scope of the appended claims.

Having thus fully disclosed by invention, what I claim is:

1. A torque converter comprising a pump for producing a circulating flow of a fluid and a turbine which is driven by said flow, the axes of rotation of said pump and said turbine being located substantially within parallel planes and displaced by 90° relative to each other in such manner that said turbine enters the cycle of said fluid only with one portion of the blades of said turbine so that said pump and said turbine interact like the worm and worm gear of a worm gearing.

2. In a torque coverter comprising a pump for producing the circulation of a fluid, and a turbine having a turbine wheel rotatable about an axis located within a plane at right angles to the plane of rotation of said pump and having a set of blades driven by the flow of said circulating fluid and movable through said flow in a direction substantially transverse thereto, a set of guide blades within said flow for controlling the same, and means for varying the torque of said turbine by varying the angle of incidence of at least one set of said blades, said pump having a longitudinal axis disposed in a plane parallel to said first-named plane.

3. A torque converter as defined in claim 2, in which said means for varying the torque of said turbine comprise control means for adjusting the speed of said turbine and for maintaining said speed at the adjusted value.

4. A torque converter comprising a pump for producing a circulating flow of a fluid and a turbine driven directly by said flow, the axes of rotation of said pump and of said turbine being located in parallel planes, said axes being mutually transversely disposed to form a projected angle of 90°, only a portion of the blades of said turbine projecting into said pump and being contacted by said fluid at any given instant.

5. A torque converter comprising a driven shaft, a driven member secured to said shaft and having a peripheral portion disposed in a plane at right angles to said shaft, driving means operably connected with said driven member and having a longitudinal axis disposed in said plane, said longitudinal axis being spaced from the axis of said driven shaft, said driven member having blade means on said peripheral portion, said driving means comprising pump means, and fluid means circulated by said pump means into driving relationship with said blade means.

6. A torque converter comprising a driven shaft, a turturbine member secured to said shaft, a plurality of blades on said turbine member, fluid means, pump means for circulating said fluid means, a substantially cylindrical casing member included in said pump means, the axes of said cylindrical casing member and of said turbine member being mutually transversely disposed and lying in parallel planes, and aperture means in said cylindrical member, a number of said plurality of blades projecting through said aperture means into said cylindrical casing member at any given instant, said fluid means impinging on said number of said plurality of blades to drive said turbine member.

References Cited by the Examiner

UNITED STATES PATENTS

| | | | |
|---|---|---|---|
| 1,199,359 | 9/1916 | Fottinger | 60—54 |
| 1,199,361 | 9/1916 | Fottinger | 60—54 |
| 1,451,997 | 4/1923 | Michell | 60—54 |
| 2,222,618 | 11/1940 | Jandasek | 60—54 |
| 2,382,034 | 8/1945 | Wemp | 60—54 |
| 2,471,799 | 5/1949 | Tombs | 60—54 |

EDGAR W. GEOGHEGAN, *Primary Examiner.*